United States Patent
Plum et al.

(10) Patent No.: US 10,065,513 B2
(45) Date of Patent: Sep. 4, 2018

(54) DEVICE FOR INDUCTIVELY TRANSMITTING ENERGY AND METHOD FOR OPERATING A DEVICE FOR INDUCTIVELY TRANSMITTING ENERGY

(71) Applicant: Robert Bosch GmbH, Stuttgart (DE)

(72) Inventors: Thomas Plum, Cologne (DE); Tobias Diekhans, Stuttgart-Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 322 days.

(21) Appl. No.: 14/916,218

(22) PCT Filed: Jul. 3, 2014

(86) PCT No.: PCT/EP2014/064236
§ 371 (c)(1),
(2) Date: Mar. 3, 2016

(87) PCT Pub. No.: WO2015/032524
PCT Pub. Date: Mar. 12, 2015

(65) Prior Publication Data
US 2016/0221451 A1     Aug. 4, 2016

(30) Foreign Application Priority Data

Sep. 6, 2013   (DE) .................. 10 2013 217 816

(51) Int. Cl.
*H01F 27/42* (2006.01)
*B60L 11/18* (2006.01)
(Continued)

(52) U.S. Cl.
CPC ............. *B60L 11/182* (2013.01); *H02J 5/005* (2013.01); *H02J 7/025* (2013.01); *H02J 17/00* (2013.01);
(Continued)

(58) Field of Classification Search
CPC .......... H02J 50/10; H02J 50/12; B60L 11/182
(Continued)

(56) References Cited

U.S. PATENT DOCUMENTS

2011/0231029 A1   9/2011   Ichikawa et al.
2012/0161696 A1*  6/2012   Cook .................... B60L 11/182
                                                           320/108
(Continued)

FOREIGN PATENT DOCUMENTS

CN          103108768 A       5/2013
DE          102010054472      6/2012
(Continued)

OTHER PUBLICATIONS

International Search Report for Application No. PCT/EP2014/064236 dated Nov. 19, 2014 (English Translation, 2 pages).

*Primary Examiner* — Thomas Skibinski
(74) *Attorney, Agent, or Firm* — Michael Best & Friedrich LLP (57) ABSTRACT

The invention relates to inductive energy transmission from a primary coil (12) to a secondary coil (22) having an additional operating state. By means of this two-sided regulation, a primary-side and secondary-side control of the power electronics is performed in accordance with a predetermined operational strategy. Thus, even in the case of unfavorable coupling factors, for example, the efficiency of the inductive energy transmission can be increased, the magnetic field in the air gap between the primary coil (12) and the secondary coil (22) can be minimized, and the inductive energy transmission can be optimized. This optimized operational strategy is enabled by means of a newly introduced idle state, which permits periodic short-circuiting of the secondary side by means of switches on the secondary side (S5, S6) of the inductive energy transmission system.

(Continued)

The invention is preferably used in the charging of the battery of an electric vehicle (4), but other applications are also possible.

9 Claims, 5 Drawing Sheets

(51) Int. Cl.
*H02J 50/12* (2016.01)
*H02J 5/00* (2016.01)
*H02J 7/02* (2016.01)
*H02J 17/00* (2006.01)
*H02J 50/10* (2016.01)

(52) U.S. Cl.
CPC .............. *H02J 50/10* (2016.02); *H02J 50/12* (2016.02); *Y02T 10/7005* (2013.01); *Y02T 10/7072* (2013.01); *Y02T 90/122* (2013.01); *Y02T 90/14* (2013.01)

(58) Field of Classification Search
USPC ....... 307/101, 104, 9.1, 10.1, 10.7; 320/108, 320/109, 107, 103, 104
See application file for complete search history.

(56) References Cited

U.S. PATENT DOCUMENTS

| | | |
|---|---|---|
| 2013/0113296 A1 | 5/2013 | Ryu et al. |
| 2013/0278053 A1 | 10/2013 | Bauer et al. |
| 2014/0292092 A1 | 10/2014 | Ichinose et al. |
| 2014/0292263 A1* | 10/2014 | Asselin ................ B60L 11/182 320/108 |

FOREIGN PATENT DOCUMENTS

| | | | |
|---|---|---|---|
| DE | 102010055696 | 6/2012 | |
| DE | 102011119259 | 5/2013 | |
| GB | 2499452 | 8/2013 | |
| JP | 2011120443 | 6/2011 | |
| JP | 2012019603 | 1/2012 | |
| WO | WO 2012079860 A2 * | 6/2012 | ............ B60L 11/182 |

* cited by examiner

DEVICE FOR INDUCTIVELY TRANSMITTING ENERGY AND METHOD FOR OPERATING A DEVICE FOR INDUCTIVELY TRANSMITTING ENERGY

BACKGROUND OF THE INVENTION

The present invention relates to a device for inductive energy transmission, and to a method for operating a device for inductive energy transmission.

Electric vehicles and plug-in hybrid vehicles, which are driven entirely or at least partially by means of electric motors, are known. The electrical energy here for driving the electric motor is provided by an electric energy store, for example a traction battery. Different approaches are taken to charging this energy store.

It is, for example, possible to connect the electric vehicle conductively to a charging station by means of a suitable charging cable. A user must establish an electrical connection between the electric vehicle and the charging station for this purpose. This can be found to be uncomfortable, in particular under bad weather conditions such as rain. As a result of the highly restricted electrical range of electric and plug-in hybrid vehicles, this cable connection must, moreover, be established by the user very often, which is felt by many users to be a significant disadvantage of electric vehicles in comparison with conventional vehicles.

Cable-free solutions for transmitting energy between the charging station and the vehicle therefore also exist. The energy is here transmitted from the charging station to the vehicle via an alternating magnetic field. The energy from the alternating magnetic field is converted in the vehicle into electrical energy, and the electrical energy passed to the energy store of the vehicle. With this solution it is, however, necessary for the vehicle to be arranged as precisely as possible over the charging station. Depending on the distance and alignment of the primary coil in the charging station and the secondary coil in the vehicle, different effects arise in the cable-free charging system. The coupling factor of the coil system can thus vary strongly. In this case there is a risk that the charging system is not operated at an optimum working point, which usually leads to a lower efficiency and/or a higher alternating magnetic field in the air gap between the primary coil and the secondary coil.

Document DE 10 2010 055 696 A1 discloses a system for contact-free transmission, wherein the frequency of the transmission system is adjusted on the primary side depending on state magnitudes of the secondary side. In addition to a pure adjustment of the system parameters on the primary side, it is additionally also possible to adjust the operating point of the inductive charging system through a power regulation on the secondary side or on both sides. A system of this type is described, for example, in document US 2011/0231029 A1, wherein an additional voltage converter is required on the secondary side.

There is also therefore a need for an inductive energy transmission that permits an improved adjustment of the energy transmission in the presence of variable coupling factors. There is, moreover, a need for an efficient and economical implementation of an inductive energy transmission with variable coupling factors.

SUMMARY OF THE INVENTION

According to a first aspect, the present invention provides a device for inductive energy transmission with a secondary coil arrangement that is designed to provide an alternating electric voltage between two terminal points, when an alternating magnetic field is coupled in a rectifier that is designed to rectify the alternating voltage provided by the secondary coil arrangement, and a switching arrangement that is designed to connect the two terminal points of the secondary coil arrangement together electrically.

According to a further aspect, the present invention provides a method for operating a device for inductive energy transmission with the steps of providing an alternating voltage between two terminal points of a secondary coil arrangement into which an alternating magnetic field is coupled; and of electrically connecting the two terminal points of the secondary coil arrangement, wherein the two terminal points of the secondary coil arrangement are connected together for a predetermined time interval during each half-wave of the provided alternating voltage.

The present invention is based on the idea of extending a system for inductive energy transmission to the secondary side in such a way that an additional degree of freedom is provided in the regulation that is used to optimize the respective working point. An additional idling state is permitted on the secondary side for this purpose, in that the two lower diodes of the rectifier are replaced by active switches. Through a targeted utilization of this newly introduced idling state, the efficiency of the inductive energy transmission can, for example, be increased at a large number of working points.

The inductive energy transmission can, moreover, also be operated under unfavorable coupling factors such that a maximum magnetic field strength is not exceeded in the air gap between the primary coil and the secondary coil. Hazards that can arise from excessively high magnetic field strengths, such as through heating up external metal objects, can thus be avoided.

Through the targeted utilization of the additional idling state on the secondary side, an inductive energy transmission is permitted over a very wide tolerance range of the coupling factor. In particular, even at coupling factors that in a conventional system would only permit a very poor inductive energy transmission or none at all, an efficient inductive energy transmission can thus nevertheless be carried out. The efficiency can also be crucially improved when operating at otherwise unfavorable working points, such as operation under partial load.

The inductive energy transmission according to the invention moreover also permits an additional protective function through the targeted and lasting short-circuiting of the secondary side in the event of a fault. An unacceptably high rise in the primary current that would occur in the presence of uncontrolled shedding of load on the secondary side can, for example, be prevented in this way.

In one embodiment, the resonance capacitors are connected in series with the primary and/or secondary coil arrangement.

According to a further embodiment, the switching arrangement comprises at least one semiconductor switch. Preferably the semiconductor switch is a MOSFET or an IGBT. Such semiconductor switches permit a reliable, fast and low-loss switching of the switching arrangement over a long period.

According to a further embodiment, the switching arrangement connects the two terminal points of the secondary coil arrangement during each half-wave of the provided alternating voltage for a predetermined interval of time. Through a periodic short-circuiting of the outputs of the secondary coil arrangement for a specific phase angle during each half-wave of the provided alternating voltage, the newly introduced operating mode can additionally be controlled in a targeted manner.

In a further embodiment, the time interval during which the two terminal points of the secondary coil arrangement are connected together electrically is determined on the basis of the magnitude of the current in the primary coil arrangement and/or the secondary coil arrangement. The currents arising can in this way be controlled in a targeted manner.

In a yet further embodiment, the time interval during which the two terminal points of the secondary coil arrangement are connected together electrically is adjusted adaptively during the energy transmission. Thus even in the presence of a variable coupling factor resulting from changes during the inductive energy transmission, an optimum adjustment of the operating mode is continuously possible. A possible optimization parameter here is, for example, the efficiency of the inductive transmission system.

According to a further embodiment, the switching arrangement only connects the two terminal points of the secondary coil arrangement together electrically when a primary current in a primary coil arrangement exceeds a predetermined value.

The present invention furthermore comprises an energy transmission device with a primary coil arrangement that is designed to provide an alternating magnetic field and a device according to the invention for inductive energy transmission into which the alternating magnetic field that is provided is coupled.

The present invention furthermore comprises a charging device for an electric vehicle with a device according to the invention for inductive energy transmission.

Further features and advantages of embodiments of the invention emerge from the following description with reference to the appended drawings.

BRIEF DESCRIPTION OF THE DRAWINGS

Here.

DETAILED DESCRIPTION

Even though the present invention is described below preferably with reference to an electric energy transmission for charging an electric vehicle, the inductive energy transmission according to the invention is not restricted to this application. It is also further possible to extend the energy transmission according to the invention to any other desired application. Furthermore the output voltage provided at the output of the device described can, in addition to charging a battery, also be used for any other desired application.

Figure 1:
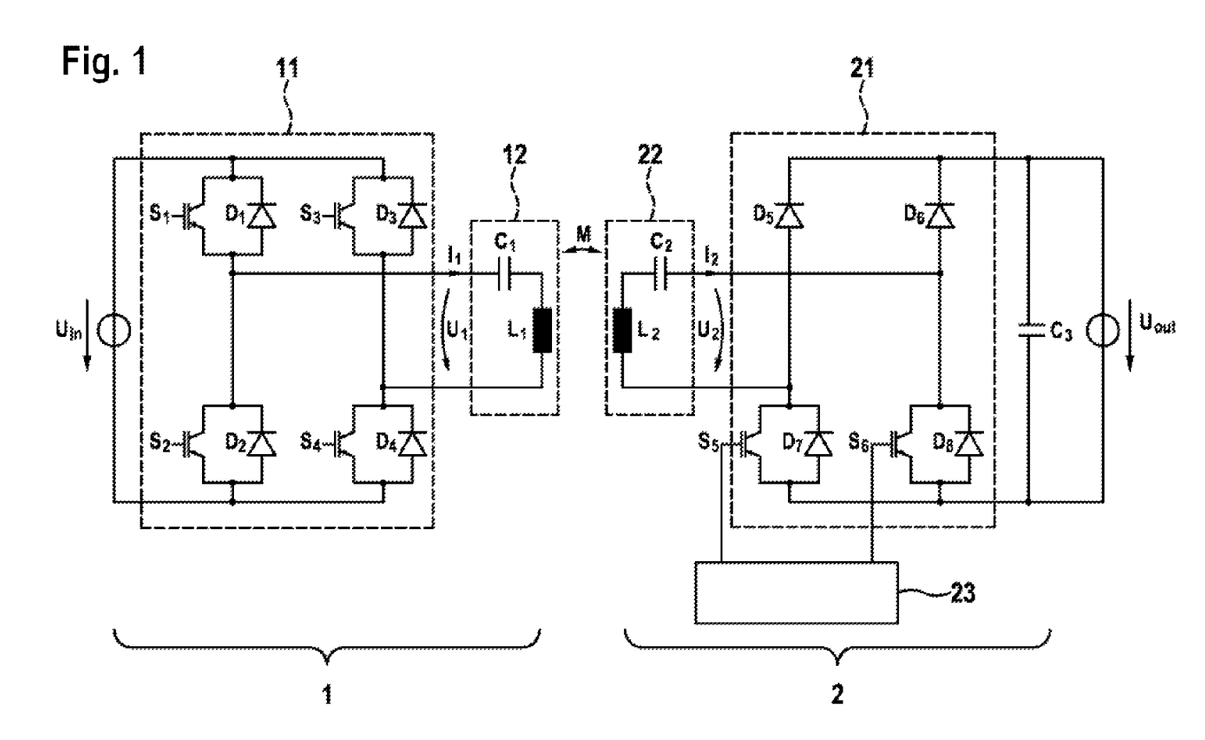
FIG. 1: shows a schematic illustration of a circuit diagram for a device for inductive energy transmission according to one embodiment.

FIG. 1 shows a schematic illustration of a circuit arrangement for an inductive energy transmission, as is the basis for an embodiment of the present invention. The circuit arrangement comprises a primary side 1 and a secondary side 2. The primary side 1 is fed from a DC voltage source 10. It is also alternatively possible for feed to be provided from an alternating voltage source with subsequent rectification. The primary side 1 can, moreover, also comprise if required a suitable step-up or step-down converter to adjust the voltage level of the input voltage $U_{in}$. The input voltage $U_{in}$ is fed to an inverter circuit 11. The inverter circuit 11 can, for example, be a full bridge with four switching elements S1 to S4. A freewheeling diode D1 to D4 can be connected in parallel with each of the switching elements S1 to S4. The (rectangular) alternating voltage $U_1$ is fed to a primary coil arrangement 12 with a series resonant circuit. This series resonant circuit comprises, for example, the primary coil $L_1$ of the inductive transmission system and a resonance capacitor $C_1$. The alternating voltage $U_1$ provided by the inverter 11 is here favorably matched to the resonance frequency $\omega_0$ of the series resonant circuit.

The secondary side 2 comprises a secondary-side coil arrangement 22 with a resonant circuit comprising the secondary coil $L_2$ of the inductive transmission system and a resonance capacitor $C_2$ connected in series with it. The two terminals of the secondary-side coil arrangement 22 are connected to the input of a rectifier 21, consisting of the diodes D5 to D8, wherein a switching element S5 or S6 is respectively arranged in parallel with the two lower diodes D7 and D8 respectively of the rectifier 21. These switching elements S5 and S6 are preferably semiconductor switching elements. MOSFETs or IGBTs can for example be used as such semiconductor switching elements. The diodes D7 and D8 do not have to be implemented discretely, but can also be the intrinsic diodes of a semiconductor switching element. These semiconductor switching elements permit fast, low-loss switching over a large number of switching processes. Other switching elements, in particular other semiconductor switching elements, are however also possible. The output voltage $U_{out}$ of the rectifier can optionally be smoothed by a smoothing capacitor $C_3$.

As can be seen from FIG. 1, the two outputs of the secondary-side coil arrangement 22 are connected together electrically by closing the two switching elements S5 and S6. The semiconductor switching elements S5 and S6 can, for example, be controlled in a targeted manner by a control device 23. This control device 23 can acquire current or voltage values from the primary side 1 or the secondary side 2 through suitable sensors, evaluate them and, on that basis, perform the control of the switching elements S5 and S6. Preferably, sensors present on the primary side 1 are here coupled to the control device 23 over a wireless radio interface. Current and/or voltage for example on the primary side or on the secondary side can be acquired in this way and evaluated. On the basis of these or, potentially, also of other parameters, the control device 23 can thus operate the switching elements S5 and S6 for optimum operation, as is described in more detail further below.

For an inductive energy transmission from the primary side 1 to the secondary side 2, an alternating magnetic field is generated by applying the alternating voltage $U_1$ to a primary-side coil arrangement 21 of the primary coil $L_1$. This alternating magnetic field is coupled into the coil $L_2$ of the secondary-side resonant circuit, where it induces an alternating electric voltage. The alternating voltage at the output of the secondary-side coil arrangement 22 is rectified by the rectifier 21, potentially smoothed by the smoothing capacitor $C_3$, and is then available at the output as an output voltage $U_{out}$. This output voltage $U_{out}$ can, for example, be used for charging a battery in an electric vehicle.

Figure 2:
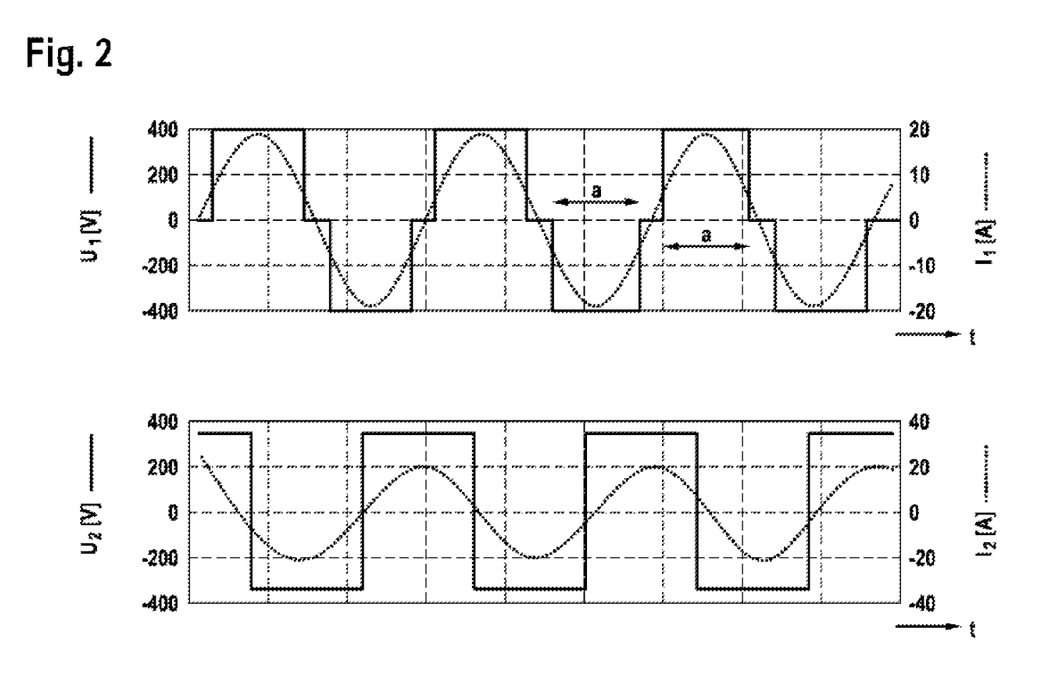
FIG. 2: shows a schematic illustration of the current and voltage curves in the primary and secondary coil arrangement under full load according to one embodiment.

FIG. 2 shows the curve of current and voltage in the primary and secondary coil arrangements 12 and 22 when operating under full load. The amplitude of the fundamental frequency of $U_1$ in the primary coil arrangement 12 can here be adjusted by a phase angle between the drive to the semiconductor switches S1 to S4. An output voltage of the inverter 11 results from this, as is illustrated in the upper diagram. The angle a here indicates the pulse width of the voltage $U_1$. An angle of a=180° corresponds to a pure rectangular voltage. The amplitude of the fundamental frequency of the voltage $U_1$ can be calculated at the resonant frequency ω as:

$$U_1 = \frac{4}{\pi} U_{in} \sin\frac{a}{2}$$

In a first operating mode, the two secondary-side semiconductor switches S5 and S6 here remain permanently open. The secondary-side power electronics thus behave like a plain, passive rectifier. In this operating mode, the amplitudes of the fundamental frequencies of the currents and the voltages at the resonant frequency ω in FIG. 2 can be calculated in terms of amount as:

$$U_2 = \frac{4}{\pi} U_{out}; I_2 = \frac{U_1}{\omega M}; I_1 = \frac{U_2}{\omega M} = \frac{4}{\pi} \frac{U_{out}}{\omega M}$$

The primary current $I_1$ here depends only on the output voltage $U_{out}$ and the mutual inductance M of the coil system consisting of the primary coil $L_1$ and the secondary coil $L_2$. This primary current $I_1$ cannot be influenced by controlling the pulse width a of the inverter 11.

Figure 3:
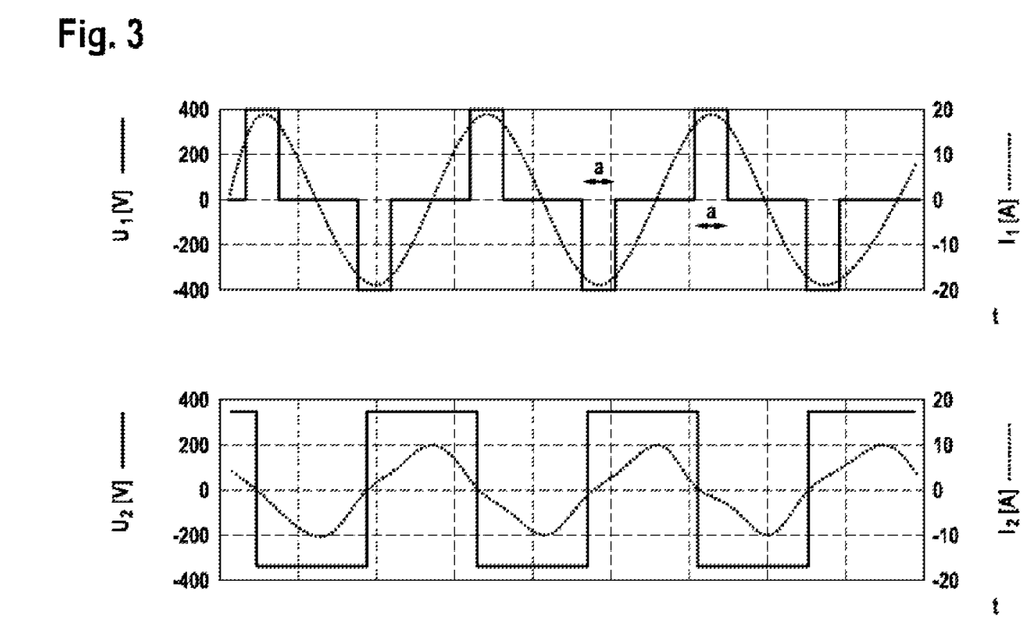
FIG. 3: shows a schematic illustration of the current and voltage curves in the primary and secondary coil arrangement under partial load.

FIG. 3 shows a schematic illustration of the curve of primary voltage $U_1$ and primary current $I_1$ against time in the upper diagram, along with a schematic illustration of secondary voltage $U_2$ and secondary current $I_2$ when operating under partial load in the lower diagram, as occurs with continuously open semiconductor switches S5 and S6 during the inductive energy transmission. This operating mode corresponds to the current and voltage curves as also occur on the secondary side with a conventional inductive energy transmission having purely primary-side regulation and passive rectifier. Here again, the current $I_1$ on the primary side cannot be affected by the regulation of the full bridge in the inverter 11. As a result of this, high losses are caused by the primary current $I_1$ when, for example, operating under partial load or with an unfavorable coupling factor on the primary side.

Figure 4:
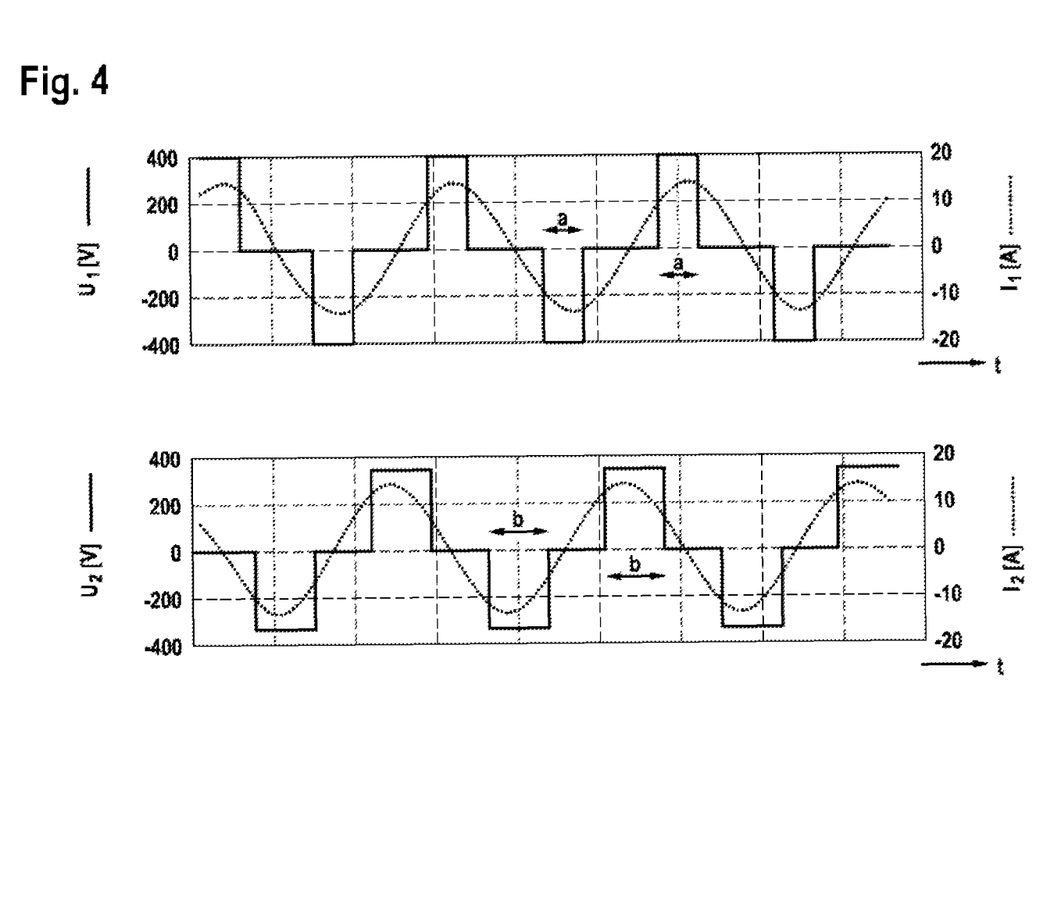
FIG. 4: shows a schematic illustration of current and voltage curves in the primary and secondary coil arrangement under partial load according to a further embodiment.

FIG. 4 also shows in the upper diagram the curve of the primary voltage $U_1$ and primary current $I_1$, and in the lower diagram the curve of the secondary voltage $U_2$ and secondary current $I_2$ when operating under partial load in a further operating mode in which the switches S5 and S6 of the secondary-side electronics are now periodically closed in a targeted manner. In this idling state, the resonant current $I_2$ continues to circulate through the secondary-side coil $L_2$ and the series resonance capacitor $C_2$. After the switches S5 and S6 are opened again, the resonant current flows through an optional smoothing capacitor $C_3$ into a load, a battery for example, connected at the output of the secondary side 2.

The electrical angle b here refers to the pulse width of the voltage $U_2$ (see FIG. 4). This corresponds to the time during which the switches S5 and S6 are open. The amplitude of the fundamental frequency of the secondary-side voltage $U_2$ can be calculated as:

$$U_2 = \frac{4}{\pi} U_{out} \sin\frac{b}{2}$$

The amplitude of the fundamental frequency of the primary-side voltage is further found to be:

$$U_1 = \frac{4}{\pi} U_{in} \sin\frac{a}{2}$$

The magnitudes of the peak values of the secondary current $I_2$ and primary current $I_1$ are thus given by:

$$I_2 = \frac{U_1}{\omega M} = \frac{1}{\omega M} \frac{4}{\pi} U_{out} \sin\frac{a}{2}; I_1 = \frac{1}{\omega M} \frac{4}{\pi} U_{out} \sin\frac{b}{2}$$

Through the newly introduced idling state on the secondary side 2 it is now therefore possible for both the primary-side current $I_1$ as well as the secondary-side current $I_2$ to be adjusted in a targeted manner. This makes it possible for the inductive energy transmission to be performed at a working point that is optimum at the time, and in that way for the inductive energy transmission to be adjusted optimally in each case, even with a different air gap, or a displacement between the primary coil $L_1$ and the secondary coil $L_2$, as well as when operating under partial load.

A variety of operating strategies are possible for determining the angular magnitude b of the electrical angle during which the switches S5 and S6 are open. As a first operating strategy equal pulse widths can, for example, be used on the primary side 1 and the secondary side 2. This means that the angle a for the drive to the inverter 11 on the primary side 1 corresponds to the angle b for the drive to the switches S5 and S6 on the secondary side 2. At a predetermined working point, the angles a and b can thus be calculated as:

$$a = b = 2\arcsin\left(\frac{\pi}{2\sqrt{2}} \sqrt{\frac{\omega M P_{soll}}{U_{in} U_{out}}}\right)$$

Here ω is the operating frequency during the inductive energy transmission, $P_{Soll}$ is the power to be transmitted, $U_{in}$ is the DC input voltage on the primary side, and $U_{out}$ is the DC output voltage on the secondary side, while M represents the mutual inductance between the primary coil $L_1$ and the secondary coil $L_2$. In this case, no additional measuring equipment is required for determining further parameters. The only precondition is an interface for communication between the primary side 1 and the secondary side 2. This interface is preferably implemented wirelessly. In addition to this, the control parameters, such as a battery charging current, must be detected and evaluated.

If the coils $L_1$ and $L_2$ are positioned unfavorably with respect to one another, the mutual inductance M is significantly lower than it is when positioning is optimum, then a conventional system with primary-side regulation with passive rectification must be operated at a significantly higher primary current $I_1$ in order to transmit the same power $P_{Soll}$ with reduced coupling. This would lead to a considerable rise in losses on the primary side. As a result of the drive according to the invention to the two switches S5 and S6 on the secondary side, this increase in the primary current with reduced coupling can become smaller. Although the primary current $I_1$ is increased, as is also the secondary current $I_2$, the total system losses however can on the whole be reduced at this working point in comparison with a conventional primary-side drive with passive rectifier. Similar considerations also apply to operation of the inductive energy transmission when operating at partial load or in the presence of other changes to the load impedance.

According to a further operating strategy, the ratio between the primary current $I_1$ and the secondary current $I_2$ is regulated to a constant value. The phase angles a and b are here, for example, selected such that the following condition applies to charging a battery on the secondary side with the rated voltage $U_{Nenn}$ and the battery voltage at the time $U_{Bat}$:

$$\frac{U_{Bat}}{U_{Nenn}} \sin\frac{b}{2} = \sin\frac{a}{2} = \frac{\pi}{2\sqrt{2}} \sqrt{\frac{\omega M P_{Soll}}{U_{in} U_{Nenn}}}$$

In addition to the advantages already described above, the actual battery voltage $U_{Bat}$ is here decoupled from the system by the secondary side 2, so that the same currents flow on the primary side 1 and the secondary side 2 as do at a nominal point for which the system has been optimized. An impedance matching of the load through the active secondary side 2 thus takes place, without an additional DC voltage converter being necessary for this purpose.

In a further operating strategy it is possible to adjust the working point adaptively. An optimum working point is here adjusted adaptively in such a way that the required power $P_{Soll}$ at a given coupling factor and a given battery voltage $U_{bat}$ can be transmitted, and at the same time an optimization parameter is maximized or minimized. Such an adaptive adjustment of the working point can be achieved on the basis of the additional degree of freedom that is enabled by the two-sided regulation according to the invention. The (measured) system efficiency can, for example, be used as optimization parameter, but other optimization parameters are also conceivable. Since during the charging process of a battery the working point only changes very slowly, this adaptive adjustment can proceed, as far as the control technology is concerned, slowly in comparison with the internal control loop.

It is furthermore also possible to adjust the working point in such a way that the magnetic field in the air gap between the primary coil $L_1$ and the secondary coil $L_2$ is minimized as far as possible. The alternating magnetic field in the air gap of the pair of coils $L_1$, $L_2$ leads to heating of metal objects that may be located in the area between the primary coil $L_1$ and secondary coil $L_2$ through induced eddy currents. At high magnetic fields, this represents a high safety risk. A metal object in this region can, for example, heat up very strongly during the energy transmission. Through the minimization according to the invention of the magnetic field in the air gap between the primary coil $L_1$ and the secondary coil $L_2$, this safety risk can be reduced. Alternatively, even if a maximum magnetic field strength is retained, the pair of coils $L_1$, $L_2$ can have smaller dimensions. The required installation space and the costs for the construction of such a system for inductive energy transmission are thus reduced.

In a further operating strategy it is possible to extend the working range of the system for inductive energy transmission through the active regulation on the secondary side. The two additional switches S5 and S6 on the secondary side 2 here remain switched off during normal operation. The secondary-side power electronics 21 here at first behave like a passive rectifier. If the primary current $I_1$ exceeds a specified threshold value, the drive to the additional switching elements S5 and S6 is activated. Through this an impedance matching is possible even under unfavorable general conditions, such as for example a poor coupling factor. The system for inductive energy transmission can thus even continue in operation when, in the conventional manner, the maximum primary current $I_1$ would be exceeded and the system would have to be switched off.

Figure 5:
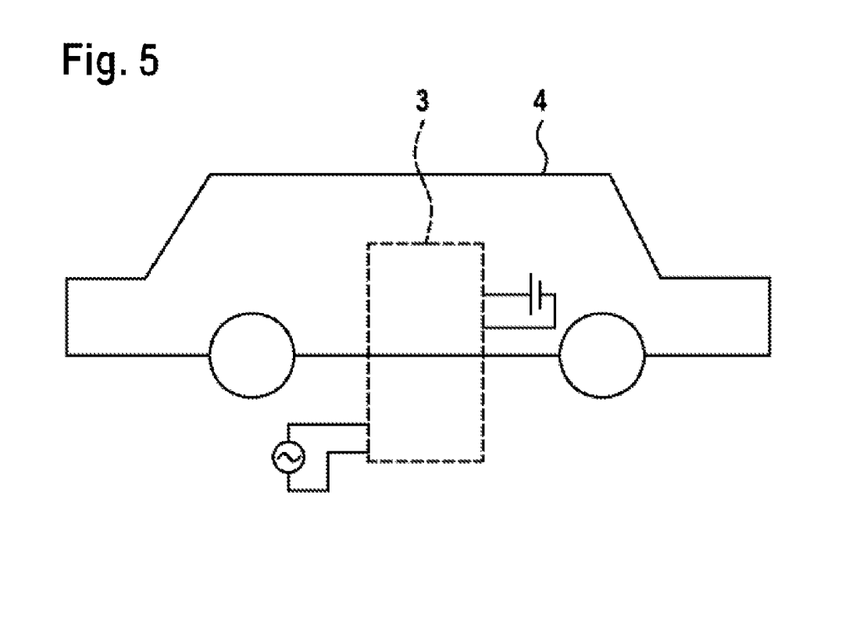
FIG. 5: shows a schematic illustration of a charging device for an electric vehicle with an energy transmission device according to one embodiment of the present invention.

FIG. 5 shows a schematic illustration of a charging device 3 for an electric vehicle 4. The charging device 3 here comprises the components described in connection with FIG. 1. In particular the charging device 3 in the motor vehicle 4 here comprises a circuit arrangement with the additional switching elements S5 and S6 in order to electrically short circuit the secondary-side coil arrangement 22 at the outputs, and thus to permit the additional idling state according to the invention. In addition, of course, charging devices for other applications such as charging a battery in a motor vehicle or the like are also possible.

Figure 6:
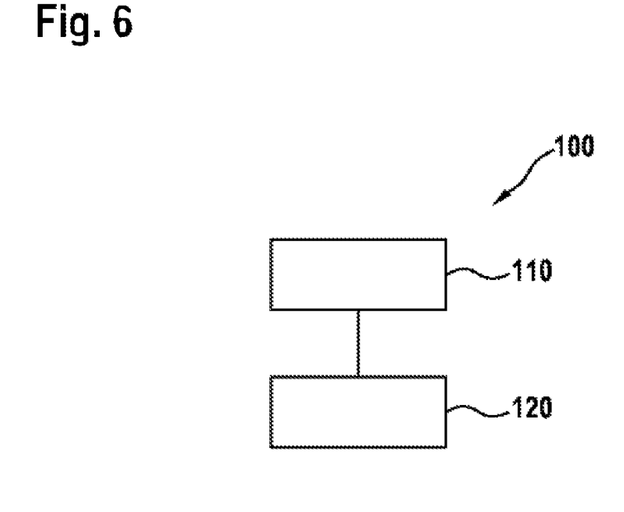
FIG. 6: shows a schematic illustration of a method for the operation of an inductive energy transmission, as based on a further embodiment of the present invention.

FIG. 6 shows a schematic illustration for a method 100 for operating a device for inductive energy transmission, as is the basis of the present invention. In step 110 an alternating voltage is provided between the two terminal points of a secondary coil arrangement 22 into which an alternating magnetic field is coupled in. In step 120 the two terminal points of the secondary coil arrangement 22 are connected together electrically, wherein the two terminal points of the secondary coil arrangement 22 are connected together for a predetermined period of time during each half-wave of the provided alternating voltage.

The predetermined interval of time during which the two terminal points of the secondary coil arrangement 22 are connected together electrically can here, as already described above, be determined on the basis of various operating strategies.

In summary, the present invention relates to an inductive energy transmission from a primary coil to a secondary coil with regulation on both sides and an additional operating state. Through this regulation on both sides the power electronics are driven on the primary and secondary sides according to a predetermined operating strategy. Thus, for example, even in the presence of unfavorable coupling factors, the efficiency of the inductive energy transmission can be increased, the magnetic field in the air gap between the primary and secondary coils can be reduced, and the inductive energy transmission can be optimized. This optimized operating strategy is permitted in the present invention by a newly introduced idling state that permits periodic short-circuiting of the secondary side.

The invention claimed is:

1. A device for inductive energy transmission, the device comprising:
   a secondary coil arrangement that is designed to provide an alternating electric voltage between two terminal points when an alternating magnetic field is coupled in;
   a rectifier that is designed to rectify the alternating electric voltage provided by the secondary coil arrangement; and a switching arrangement that is designed to connect the two terminal points of the secondary coil arrangement together electrically, wherein the switching arrangement is designed to connect the two terminal points of the secondary coil arrangement together electrically during each half-wave of the alternating electric voltage for a predetermined interval of time, wherein the predetermined interval of time is less than each half-wave of the alternating electric voltage.

2. The device as claimed in claim 1, wherein resonance capacitors are connected in series with a primary coil arrangement, the secondary coil arrangement, or both.

3. The device as claimed in claim 1, wherein the switching arrangement comprises at least one semiconductor switch.

4. The device as claimed in claim 1, wherein the time interval during which the two terminal points of the secondary coil arrangement are connected together electrically is determined on the basis of a measured electrical parameter in a primary coil arrangement, the secondary coil arrangement, or both.

5. The device as claimed in claim 1, wherein the time interval during which the two terminal points of the secondary coil arrangement are connected together electrically is adjusted adaptively during the energy transmission.

6. The device as claimed in claim 1, wherein the switching arrangement only connects the two terminal points of the secondary coil arrangement together electrically when a primary current in a primary coil arrangement exceeds a predetermined value.

7. An energy transmission device, with
a primary coil arrangement that is designed to provide an alternating magnetic field; and
a device as claimed in claim 1, wherein the provided alternating magnetic field is at least partially coupled into the secondary coil arrangement.

8. A charging device for an electric vehicle with a device for inductive energy transmission as claimed in claim 1.

9. A method for operating a device for inductive energy transmission, the method comprising:
providing an alternating electric voltage between two terminal points of a secondary coil arrangement;
electrically connecting the two terminal points of the secondary coil arrangement, wherein two terminal points of the secondary coil arrangement are connected together for a predetermined time interval during each half-wave of the provided alternating electric voltage, wherein the predetermined interval of time is less than each half-wave of the alternating electric voltage.

* * * * *